US010605385B2

(12) United States Patent
Blondel et al.

(10) Patent No.: US 10,605,385 B2
(45) Date of Patent: Mar. 31, 2020

(54) USE OF SEMI-AROMATIC COPOLYAMIDE FOR TRANSPORTING REFRIGERANT FLUID

(71) Applicant: Arkema France, Colombes (FR)

(72) Inventors: Philippe Blondel, Bernay (FR); Benoit Brule, Beaumont-le-roger (FR); Eric Gamache, Philadelphia, PA (US); Estelle Meurice Pierrat, Corneville sur-Risle (FR)

(73) Assignee: Arkema France, Colombes (FR)

( * ) Notice: Subject to any disclaimer, the term of this patent is extended or adjusted under 35 U.S.C. 154(b) by 227 days.

(21) Appl. No.: 14/767,530

(22) PCT Filed: Feb. 13, 2014

(86) PCT No.: PCT/FR2014/050290
§ 371 (c)(1),
(2) Date: Aug. 12, 2015

(87) PCT Pub. No.: WO2014/125218
PCT Pub. Date: Aug. 21, 2014

(65) Prior Publication Data
US 2015/0377389 A1    Dec. 31, 2015

(30) Foreign Application Priority Data
Feb. 18, 2013   (FR) ...................... 13 51361

(51) Int. Cl.
*C08G 69/26* (2006.01)
*F16L 11/08* (2006.01)
*B29C 48/00* (2019.01)
*C09K 5/04* (2006.01)
*C08G 69/36* (2006.01)
*B32B 25/14* (2006.01)
*B32B 27/34* (2006.01)
*C08L 77/06* (2006.01)
*B32B 27/32* (2006.01)
*C08L 77/02* (2006.01)
*B32B 1/08* (2006.01)
*B32B 25/10* (2006.01)
*B32B 27/20* (2006.01)
*B32B 27/22* (2006.01)
*B32B 25/08* (2006.01)
*B29C 45/00* (2006.01)
(Continued)

(52) U.S. Cl.
CPC ........ *F16L 11/085* (2013.01); *B29C 45/0001* (2013.01); *B29C 48/022* (2019.02); *B29C 49/0005* (2013.01); *B32B 1/08* (2013.01); *B32B 25/08* (2013.01); *B32B 25/10* (2013.01); *B32B 25/14* (2013.01); *B32B 27/20* (2013.01); *B32B 27/22* (2013.01); *B32B 27/32* (2013.01); *B32B 27/34* (2013.01); *C08G 69/26* (2013.01);
*C08G 69/265* (2013.01); *C08G 69/36* (2013.01); *C08L 77/02* (2013.01); *C08L 77/06* (2013.01); *C09K 5/044* (2013.01); *C09K 5/045* (2013.01); *F25B 13/00* (2013.01); *B29K 2077/00* (2013.01); *B29L 2023/005* (2013.01); *B32B 2307/306* (2013.01); *B32B 2307/308* (2013.01); *B32B 2307/714* (2013.01); *B32B 2307/7265* (2013.01); *B32B 2307/734* (2013.01); *B32B 2597/00* (2013.01); *C09K 2205/122* (2013.01); *C09K 2205/126* (2013.01); *C09K 2205/22* (2013.01); *F25B 41/003* (2013.01); *F25B 2400/121* (2013.01)

(58) Field of Classification Search
CPC ....... C08L 77/06; C09J 177/06; C08G 69/265
See application file for complete search history.

(56) References Cited

U.S. PATENT DOCUMENTS

| 2,705,227 A | 3/1955 | Stamatoff |
| 5,003,009 A | 3/1991 | Matthies et al. |

(Continued)

FOREIGN PATENT DOCUMENTS

| AU | 630600 | 9/1989 |
| EP | 0212510 A2 | 3/1987 |

(Continued)

OTHER PUBLICATIONS

International Search Report for International Application No. PCT/FR2014/050290 dated Apr. 17, 2014.

(Continued)

*Primary Examiner* — Gregory Listvoyb
(74) *Attorney, Agent, or Firm* — RatnerPrestia

(57) ABSTRACT

The invention relates to the use of a layer consisting of a composition comprising a copolyamide of formula X/10.T/Y for transporting a heat transfer fluid in a vapor compression circuit, wherein: X represents either the residues of an aliphatic amino acid comprising between 8 and 18 carbon atoms, or a lactam, or the unit $X_1.X_2$ representing the residues resulting from the condensation of an aliphatic diamine comprising between 6 and 18 carbon atoms and a (cyclo)aliphatic diacid comprising between 6 and 18 carbon atoms; 10.T represents the residues resulting from the condensation of a decanediamine and terephthalic acid; and Y represents the residues resulting from the condensation of an aliphatic diamine comprising between 9 and 14 carbon atoms and an aromatic diacid, Y being different from the unit 10.T; the molar proportion of 10.T units being higher than 0%.

17 Claims, 1 Drawing Sheet

(51) Int. Cl.
*B29C 49/00* (2006.01)
*F25B 13/00* (2006.01)
*F25B 41/00* (2006.01)
*B29K 77/00* (2006.01)
*B29L 23/00* (2006.01)

(56) References Cited

U.S. PATENT DOCUMENTS

| | | | |
|---|---|---|---|
| 5,292,808 A | 3/1994 | Ohmae et al. | |
| 5,440,006 A | 8/1995 | Lahary et al. | |
| 8,420,221 B2 | 4/2013 | Hewel et al. | |
| 8,748,004 B2 | 6/2014 | Briffaud et al. | |
| 9,012,026 B2 | 4/2015 | Briffaud | |
| 9,102,828 B2 | 8/2015 | Blondel et al. | |
| 2005/0096430 A1 | 5/2005 | Blondel et al. | |
| 2006/0074158 A1 | 4/2006 | Blondel et al. | |
| 2007/0048475 A1 | 3/2007 | Haines | |
| 2009/0098325 A1 | 4/2009 | Uchida et al. | |
| 2009/0252979 A1* | 10/2009 | Ferreiro | B32B 1/08 428/474.7 |
| 2010/0175421 A1 | 7/2010 | Kaneko | |
| 2010/0282999 A1 | 11/2010 | Shimomura | |
| 2011/0123749 A1 | 5/2011 | Hewel | |
| 2011/0136957 A1 | 6/2011 | Kamishima | |
| 2011/0155359 A1* | 6/2011 | Doshi | B32B 1/08 165/180 |
| 2011/0183095 A1 | 7/2011 | Defilippi | |
| 2011/0195215 A1 | 8/2011 | Briffaud | |
| 2011/0239674 A1 | 10/2011 | Defilippi | |
| 2011/0277492 A1 | 11/2011 | Defilippi | |
| 2012/0018995 A1 | 1/2012 | Defilippi | |
| 2012/0202896 A1* | 8/2012 | Blondel | C08L 77/00 514/772.5 |
| 2012/0279605 A1 | 11/2012 | Nozaki | |
| 2012/0329944 A1 | 12/2012 | Briffaud | |
| 2014/0246096 A1 | 9/2014 | Blondel | |
| 2014/0299220 A1 | 10/2014 | Montanari et al. | |
| 2017/0073470 A1 | 3/2017 | Briffaud et al. | |

FOREIGN PATENT DOCUMENTS

| | | |
|---|---|---|
| EP | 0342066 | 11/1989 |
| EP | 1505099 | 2/2005 |
| EP | 1717022 | 11/2006 |
| EP | 2098365 | 9/2009 |
| EP | 2098580 | 9/2009 |
| JP | 2005054191 A | 3/2005 |
| JP | 2008179753 A | 8/2008 |
| JP | 2011111624 A | 6/2011 |
| JP | 2011207837 A | 10/2011 |
| JP | 2011530614 A | 12/2011 |
| JP | 2011530615 A | 12/2011 |
| JP | 2012136579 A | 7/2012 |
| JP | 2012224085 A | 11/2012 |
| JP | 2012243982 A | 12/2012 |
| JP | 2013501118 A | 1/2013 |
| JP | 2013514442 A | 4/2013 |
| WO | 2006037615 | 4/2006 |
| WO | 2010015785 | 2/2010 |
| WO | 2010015786 | 2/2010 |
| WO | 2010061289 | 6/2010 |
| WO | 2010075046 | 7/2010 |
| WO | 2011015790 | 2/2011 |
| WO | 2011074536 A1 | 6/2011 |
| WO | 2011077032 | 6/2011 |
| WO | 2011084421 A1 | 7/2011 |
| WO | 2012160425 A1 | 11/2012 |
| WO | 2013054026 | 4/2013 |

OTHER PUBLICATIONS

International Search Report for International Application No. PCT/FR2014/050291 dated Apr. 17, 2014.
Non Final Office Action for U.S. Appl. No. 14/767,549, dated Jun. 26, 2017, 18 pages.
Notice of Reasons for Rejection for Japanese Application No. 2015-557501, dated Sep. 19, 2017, 7 pages.
International Search Report of PCT/FR2010/051659 (dated Feb. 23, 2011).
Final Office Action in U.S. Appl. No. 14/767,546, dated Dec. 20, 2017 (20 pages).
Notice of Allowance in U.S. Appl. No. 14/767,549 dated Apr. 12, 2018 (15 pages).
Japanese Preliminary Examination Report for Japanese Application No. 2015-557500, dated Jun. 7, 2018, 4 pages.

* cited by examiner

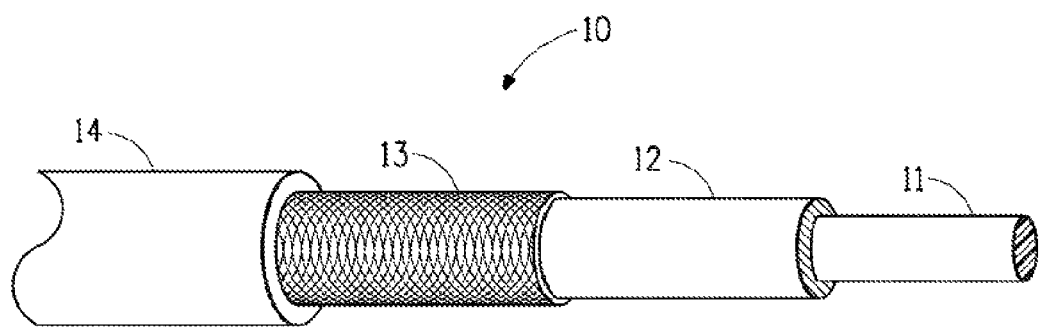

USE OF SEMI-AROMATIC COPOLYAMIDE FOR TRANSPORTING REFRIGERANT FLUID

CROSS-REFERENCE TO RELATED APPLICATIONS

This is a national phase of International Application No. PCT/FR2014/050290, filed Feb. 13, 2014, which claims priority to French Application No. 13.51361, filed Feb. 18, 2013. The disclosures of each of these applications are incorporated herein by reference in their entireties for all purposes.

FIELD OF THE INVENTION

The present invention relates to the use of a composition based on semi-aromatic copolyamide for producing circuit elements intended for transporting a refrigerant fluid (such as R-1234yf), especially in the field of motor vehicle air conditioning.

TECHNICAL BACKGROUND

The transporting of refrigerant fluids in vapor compression circuits, such as those employed more particularly in motor vehicle air conditioning, necessitates the use of materials having a very specific set of mechanical, thermal, and chemical properties.

The elements in these circuits (and especially the tubing) are required in particular:
- to be impervious to the fluids being transported (and in particular to fluorocarbon refrigerant compounds), and also to water and to oxygen;
- to exhibit chemical resistance to the fluids being transported, and also to water and to oxygen, in order to prevent excessive degradation over the long term;
- to exhibit sufficient mechanical resistance but also sufficient flexibility (especially in motor vehicle air conditioning, where the under-hood assembly and congestion constraints dictate folding of the tubing);
- to exhibit satisfactory heat resistance, owing to the fact that the fluids being transported may be at a high temperature, and that the temperature of the environment may also be high (especially in motor vehicle air conditioning, since the components in question may be positioned close to the engine).

The above constraints are particularly difficult to observe with certain refrigerant fluids. For example, the fluid R-1234yf (2,3,3,3-tetrafluoropropene), which can be used more particularly in motor vehicle air conditioning, is more chemically reactive than the fluids of the preceding generation, such as R-134a (1,1,1,2-tetrafluoroethane). The chemical resistance and the barrier properties of the elements in the vapor compression circuits are therefore even more critical. The difficulty of observing the constraints above is exacerbated by the fact that certain lubricants, when used in a mixture with refrigerant compounds (such as polyalkylene glycols or PAGs), also have a tendency to be aggressive with respect to these circuit elements.

At the present time, the tubing for transporting refrigerant fluids in motor vehicle air conditioning comprises rigid metallic portions (generally made of aluminum) and flexible portions made of multilayer tubes. Some of these multilayer tubes are known as veneer tubes; they comprise in succession, from the outside to the inside, a first layer of rubber-type elastomer, a reinforcing braid, a second layer of rubber-type elastomer, and an inner layer based on polyamide.

In the versions available commercially, the inner layer based on polyamide (or PA) may be, for example, a formulated PA 6 (polycaprolactam) (with or without plasticizer, with or without impact modifier, with or without stabilizer), a formulated PA 6/6.6 copolyamide (with or without plasticizer, with or without impact modifier, with or without stabilizer), or else an alloy PA or PA 6.6 (polyhexamethylene adipamide) with polyolefins and functionalized polyolefins (product sold under the brand name Orgalloy® by Arkema).

Furthermore, document US 2007/0048475 describes a variant of these multilayer tubes, wherein the inner layer is based on PA 9.T (polymer of 1,9-nonanediamine or 2-methyl-1,8-ottanediamine and terephthalic acid), optionally blended with another polyamide resin.

Document US 2012/0279605 describes another variant of the multilayer tubes above, wherein the inner layer is a composition comprising a polyamide, an impact modifier, a phenolic antioxidant, a plasticizer, and a copper-based heat stabilizer. The polymer may be selected from a list of polymers including, in particular, PA 6/6.T (copolymer containing PA 6 segments and PA 6.T segments, in other words a polymer of hexamethylenediamine and terephthalic acid). The preferred polyamide, however, is PA 6.

Document US 2011/0136957 describes a resin for the inner layer of a vapor compression circuit, the resin being said to be chemically resistant toward R-1234yf. The resin is selected from a long list of polymers, including polyamides and more particularly semi-aromatic polyamides. In the examples, the resins used are based on PTFE (polytetrafluoroethylene) of polyimide.

Document US 2011/0183095 describes tubes for transporting heat transfer fluids in motor vehicle air conditioning, comprising an inner layer based on PA 6.10 (polyhexamethylene sebacamide) and an outer layer based on a polyamide such as a polyphthalamide. The polyphthalamide exemplified is PA 9.T.

Document US 2011/0239674 describes joints for a vapor compression circuit, made from the same materials. Document US 2012/0018995 also describes assemblies of tubes and joints that are made from the same materials. Documents WO 2010/061289 and US 2011/0277492 further describe vapor compression circuit elements made from these same materials.

Document US 2011/0155359 relates to tubes for transporting R-1234yf that are made from a resin based on semi-aromatic polyamide. The semi-aromatic copolyamide used in the examples is PA 6.6/6.T (copolymer of PA 6.6 and PA 6.T).

In a more general context, document EP 1505099 describes compositions intended for replacement of rubbers or metals, or for use as materials of electrical cables, or for the manufacture of tanks, hoses, and containers. These compositions comprise copolyamides of general formula PA X/Y.Ar (Ar meaning aromatic), including PA 11/10.T, which results from the condensation of aminoundecanoic acid, 1,10-decanediamine, and terephthalic acid.

Document WO 2006/037615 describes compositions based on semicrystallized polyamides for the manufacture of flexible tubes for transporting different fluids such as fuels (gasoline or diesel), hydraulic braking fluid, and others. PA 6.10, PA 6.12, and PA 10.10 are given as examples.

Document EP 1717022 relates to multilayer tubes for various applications, and more particularly for the transport of fuel in vehicles, from the tank to the engine. These tubes comprise an intermediate polyamide layer, made for example of PA 6.10 (polyhexamethylene sebacamide) or PA 6.12 (polyhexamethylene dodecanamide).

Documents WO 2010/015785 and WO 2010/015786 describe compositions based on semi-aromatic copolyamide of general formula A/10.T for the manufacture of various articles, for instance consumer goods such as electrical, electronic, or automotive equipment, surgical hardware, packaging, or else sports articles.

Similar applications are envisaged in document WO 2011/015790, which relates to compositions based on copolyamide 11/10.T, 12/10.T, etc.

Document WO 2011/077032 aims to provide a semi-aromatic polyamide which can be used generally in the manufacture of a variety of articles, for instance electronic components intended for electrical or electronic equipment in the field of road transport, road traffic or rail traffic, in the aeronautical, audio-video, and videogames fields, and also in the industrial sector. This semi-aromatic polyamide may be, among others, of formula 10/10.T, 11/10.T, 12/10.T, etc.

Document US 2011/0123749 describes a copolyamide corresponding to the condensation of 1,6-hexanediamine, 1,10-decanediamine, terephthalic acid, and at least one further monomer selected from the group of dicarboxylic acids comprising from 8 to 18 carbon atoms, laurolactam, aminolauric acid, and combinations thereof. The intended uses are as containers and conduits in the automotive sector, as for example fuel, oil, coolant, or urea lines.

None of the above documents describes polymeric material having properties that are fully satisfactory for the transport of heat transfer fluid, especially in motor vehicle air conditioning, and especially when the heat transfer fluid is a hydrofluorocarbon compound (HFO) such as R-1234yf (mixed with a lubricating oil).

There is therefore a need for development of vapor compression circuit elements that display an effective compromise between their properties of imperviousness to the heat transfer fluid, to water, and to oxygen, their chemical resistance to the heat transfer fluid, to water, and to oxygen, their mechanical strength, their flexibility, and their heat resistance. This need is felt particularly in the area of motor vehicle air conditioning, especially when the heat transfer fluid is R-1234yf, admixed with a lubricant such as a polyalkylene glycol (PAG) or else polyol ester (POE) oil.

SUMMARY OF THE INVENTION

The invention concerns first of all a vapor compression circuit element comprising at least one layer composed of a composition comprising copolyamide of formula X/10.T/Y, in which:

X represents alternatively the residues of an aliphatic amino acid comprising from 8 to 18 carbon atoms, or the unit $X_1.X_2$ which represents the residues resulting from the condensation of an aliphatic diamine comprising from 6 to 18 carbon atoms and a (cyclo) aliphatic dicarboxylic acid comprising from 6 to 18 carbon atoms;

10.T represents the residues from the condensation of a decane diamine and terephthalic acid; and Y represents from the condensation of an aliphatic diamine comprising from 9 to 14 carbon atoms and an aromatic dicarboxylic acid;

the molar proportion of units 10.T in the copolyamide being greater than 0%;

the molar proportion of the units Y relative to the total of units 10.T and Y being from 0% to 30%; and the proportion of units X being from 0.4 to 0.8 mol per mole of semi-aromatic units 10.T and Y.

According to one embodiment, the copolyamide of formula X/10.T/Y is a copolyamide of formula X/10.T.

According to one embodiment, X represents either the residues of an aliphatic amino acid comprising from 10 to 12 carbon atoms or the unit $X_1.X_2$ which represents the residues resulting from the condensation of an aliphatic diamine comprising from 6 to 12 carbon atoms and an aliphatic diacid comprising from 6 to 12 carbon atoms.

According to one embodiment, Y represents a unit 10.I, 9.T, 12.T, or 14.T.

According to one embodiment, the copolyamide of formula X/10.T/Y is selected from the copolyamides of formulae 11/10.T, 12/10.T, 6.10/10.T, 6.12/10.T, 10.6/10.T, 10.10/10.T, 10.12/10.T, 12.12/10.T, and 10.14/10.T, and more preferably is a copolyamide of formula 11/10.T.

According to one embodiment, the proportion of units X in the copolyamide is from 0.5 to 0.7 mol per mole of semi-aromatic units 10.T and Y.

According to one embodiment, the copolyamide X/10.T/Y is present in the composition in a proportion by mass of 30% to 99%, preferably of 40% to 95%, more preferably of 50% to 85%; and/or the composition further comprises:

optionally, one or more functionalized or non-functionalized polyolefins, preferably in a proportion by mass of 5% to 40%, more preferably of 12% to 36%;

optionally, one or more plasticizers, preferably in a proportion by mass of 1% to 10%, more preferably of 2% to 7%;

optionally, one or more additives selected from conversion aids, fillers, heat stabilizers, UV stabilizers, nucleating agents, dyes, pigments, mold release agents, flame retardants, surfactants, fluorescent whiteners, antioxidants, and mixtures thereof.

According to one embodiment, the vapor compression circuit element is suitable for transporting a heat transfer fluid, said heat transfer fluid being preferably selected from hydrocarbon, hydrofluorocarbon (HFO), ether, hydrofluoroether, or fluoroolefin compounds, more particularly from fluoropropenes, fluoropropanes, and fluoroethanes; and more preferably from 1,3,3,3-tetrafluoropropene, 2,3,3,3-tetrafluoropropene, 1,2,3,3,3-pentafluoropropene, 1,1,3,3-tetrafluoropropene, 3,3,3-trifluoropropene, 2,3,3-trifluoropropene, 1,1,1,2-tetrafluoroethane, 1,1,2,2-tetrafluoroethane, pentafluoroethane, difluoromethane, 1,1-difluoroethane, 1,1,1,2,3,3,3-heptafluoropropane, 1,1,1-trifluoropropane, 1,1,1,3,3,3-hexafluoropropane, 1,1,1,3,3-pentafluoropropane, 1,1,1,3,3-pentafluorobutane, trifluoroiodomethane, and mixtures comprising them; and especially preferably said heat transfer fluid comprising or being 2,3,3,3-tetrafluoropropene.

According to one embodiment, the heat transfer fluid is admixed with a lubricant preferably selected from mineral oils, silicone oils, paraffins of natural origin, naphthenes, synthetic paraffins, alkylbenzenes, poly-alpha-olefins, polyalkylene glycols, polyol esters and/or polyvinyl ethers; the lubricant being more preferably a polyalkylene glycol or a polyol ester. The lubricant content of the refrigerant+lubricant mixture is, for example, from 0.05% to 10% by weight, preferably from 1% to 5%.

According to one embodiment, the vapor compression circuit element belongs to a vapor compression circuit integrated in a device selected from mobile or stationary air conditioning devices, refrigeration devices, freezing devices, Rankine-cycle and heat-pump heating devices; and preferably integrated in a motor vehicle air conditioning device.

The term "integrated" means that the vapor compression circuit belongs to the device and that, consequently, the vapor compression circuit element, which belongs to the vapor compression circuit, also belongs to the device.

In other words, the device is composed of a vapor compression circuit comprising one or more vapor compression circuit elements.

According to one embodiment, the vapor compression circuit element is a connection element or a pipe.

According to one embodiment, said layer composed of a composition comprising a copolyamide X/10.T/Y is disposed on an inner surface of the element.

According to one embodiment, the vapor compression circuit element is a multilayer tube, preferably comprising in succession:
- an inner layer which is said layer composed of a composition comprising a copolyamidex X/10.TN;
- optionally, a first intermediate layer disposed above said layer, composed of a first composition comprising an elastomeric material;
- optionally, a second intermediate layer disposed above said layer, composed of a reinforcing textile;
- an outer layer disposed above said layer, composed of a second composition comprising an elastomeric material;
- each composition comprising an elastomeric material being preferably a composition comprising an ethylene-propylene rubber or an ethylene-propylene-diene monomer rubber.

According to one embodiment, the vapor compression circuit element is an extruded article.

The invention also provides a heat transfer device comprising a vapor compression circuit which comprises at least one vapor compression circuit element as described above, and preferably a plurality of such elements.

According to one embodiment, the heat transfer device is selected from mobile or stationary air conditioning devices, refrigeration devices, freezing devices, Rankine-cycle and heat-pump heating devices; said device preferably being a motor vehicle air conditioning device.

According to one embodiment, the vapor compression circuit contains a heat transfer fluid selected from hydrocarbon, hydrofluorocarbon (HFO), ether, hydrofluoroether, or fluoroolefin compounds, more particularly from fluoropropenes, fluoropropanes, and fluoroethanes; and preferably from 1,3,3,3-tetrafluoropropene, 2,3,3,3-tetrafluoropropene, 1,2,3,3,3-pentafluoropropene, 1,1,3,3-tetrafluoropropene, 3,3,3-trifluoropropene, 2,3,3-trifluoropropene, 1,1,1,2-tetrafluoroethane, 1,1,2,2-tetrafluoroethane, pentafluoroethane, difluoromethane, 1,1-difluoroethane, 1,1,1,2,3,3,3-heptafluoropropane, 1,1,1-trifluoropropane, 1,1,1,3,3,3-hexafluoropropane, 1,1,1,3,3-pentafluoropropane, 1,1,1,3,3-pentafluorobutane, trifluoroiodomethane, and mixtures comprising them; and very preferably said heat transfer fluid comprises or is 2,3,3,3-tetrafluoropropene.

According to one embodiment, the heat transfer fluid is admixed with a lubricant, preferably selected from mineral oils, silicone oils, paraffins of natural origin, naphthenes, synthetic paraffins, alkylbenzenes, poly-alpha-olefins, polyalkylene glycols, polyol esters and/or polyvinyl ethers; the lubricant being more preferably a polyalkylene glycol or a polyol ester.

The invention also provides the use of a layer composed of a composition comprising a copolyamide of formula X/10.T/Y for transporting a heat transfer fluid in a vapor compression circuit in which.
- X represents alternatively the residues of an aliphatic amino acid comprising from 8 to 18 carbon atoms, or the unit $X_1.X_2$ which represents the residues resulting from the condensation of an aliphatic diamine comprising from 6 to 18 carbon atoms and a (cyclo) aliphatic dicarboxylic acid comprising from 6 to 18 carbon atoms;
- 10.T represents the residues from the condensation of a decane diamine and terephthalic acid; and
- Y represents from the condensation of an aliphatic diamine comprising from 9 to 14 carbon atoms and an aromatic dicarboxylic acid;
- the molar proportion of units 10.T being greater than 0%;
- the molar proportion of the units Y relative to the total of units 10.T and Y being from 0% to 30%; and
- the proportion of units X being from 0.4 to 0.8 mol per mole of aromatic units 10.T and Y.

According to one embodiment, the composition is as described above.

According to one embodiment, the heat transfer fluid is as described above.

According to one embodiment, the layer composed of a composition comprising a copolyamide X/10.T/Y is a layer of a vapor compression circuit element as described above.

The invention also provides a method for heating or cooling a liquid or a body by means of a vapor compression circuit containing a heat transfer fluid, said method comprising in succession the evaporation of the heat transfer fluid, the compression of the heat transfer fluid, the condensation of the heat fluid, and the expansion of the heat transfer fluid, wherein the vapor compression circuit comprises a vapor compression circuit element as described above.

According to one embodiment, this method for heating or cooling is a method for heating, air conditioning, refrigerating, or freezing, and preferably is a method for air conditioning in a motor vehicle.

According to one embodiment, the heat transfer fluid used in the heating or the cooling is as described above.

The invention also provides a method for producing the circuit element as described above, comprising a step of applying a layer of a composition comprising a copolyamide of formula X/10.T/Y.

According to one embodiment, this layer is applied by injection molding, extrusion, extrusion-blow molding, coextrusion, or multiple injection molding.

According to one embodiment, the circuit element is a multilayer tube as described above, the method for producing this element comprising the successive extrusion, on a mandrel, of the inner layer, optionally of the first intermediate layer, optionally of the second intermediate layer then of the outer layer.

The present invention allows the drawbacks of the prior art to be overcome. It provides more particularly a composition based on semi-aromatic copolyamide that allows to be produced vapor compression circuit elements exhibiting an effective compromise between their properties of imperviosity to the heat transfer fluid, to water, and to oxygen, their chemical resistance to the heat transfer fluid, to water, and to oxygen, their mechanical strength, their flexibility, and their heat resistance, all of this especially within the field of motor vehicle air conditioning, and especially when the heat transfer fluid is a HFO such as R-1234yf, admixed with a lubricant such as a PAG or POE oil.

Relative to the PA 6 polyamide-based compositions which are in use at present in the trade as an inner layer for multilayer tubes for motor vehicle air conditioning vapor compression circuits, the compositions of the invention allow the production of a layer having, in particular, enhanced:

barrier properties to heat transfer fluids (especially R-1234yf, but also R-134a, for example); and/or dimensional stability properties with respect to water; and/or barrier properties with respect to water; and/or chemical and thermal stability properties in the presence of R-1234yf and PAG-type lubricant; and/or long-term thermal stability properties; and/or flexibility properties.

Relative to the compositions based on polyphthalamide PA 6.T or PA 9.T that are mentioned in some of the documents set out above, the compositions of the invention allow the production of a layer having, in particular, enhanced:

dimensional stability properties with respect to water; and/or barrier properties with respect to water; and/or long-term thermal stability properties; and/or flexibility properties; and/or properties of adhesion to an elastomer; and/or shaping properties (capacity for conversion).

DESCRIPTION OF THE FIGURES

FIG. 1 schematically shows a multilayer tube according to one embodiment of the invention.

DESCRIPTION OF CERTAIN EMBODIMENTS OF THE INVENTION

The invention is now described in greater detail, without limitation, in the description which follows.

Semi-Aromatic Copolyamide Used According to the Invention

The nomenclature used in defining the polyamides is described in standard ISO 1874-1:1992 "*Plastics—Polyamide (PA) molding and extrusion materials—Part 1: Designation*", particularly on page 3 (tables 1 and 2).

The invention resides in the use of a semi-aromatic copolyamide of general formula X/10.TN, on the understanding that this formula covers both copolymers X/10.T (containing only units X and 10.T) and terpolymers X/10.T/Y (containing units X, 10.T, and Y).

Hereinafter, the copolyamide X/10.TN is called "copolyamide of the invention" and the composition containing this copolyamide is called "composition of the invention" for greater simplicity.

It is recalled that X represents alternatively the residues of an aliphatic amino acid comprising from 8 to 18 carbon atoms, or the unit $X_1.X_2$ which represents the radicals resulting from the condensation of a diamine comprising from 6 to 18 carbon atoms and a (cyclo)aliphatic diacid comprising from 6 to 18 carbon atoms; that 10.T represents the residues from the condensation of a decanediamine and terephthalic acid, in stochiometric proportions; and that Y represents the residues from the condensation of an aliphatic diamine comprising from 9 to 14 carbon atoms and an aromatic dicarboxylic acid (Y is different from the unit 10.T, the latter already being present in the copolyamide in any case).

The decanediamine condensed with the terephthalic acid (unit 10.T) may be linear or branched, or a mixture of two or more decanediamines. The diamine in question is preferably 1,10-decanediamine (linear), which is less sensitive to water.

As far as the unit Y is concerned, the diamine may be linear or branched, preferably linear, and may comprise 9, or 10, or 11, or 12, or 13, or 14 carbon atoms. The aromatic dicarboxylic acid may in particular be terephthalic acid or isophthalic acid. The length of the diamine chain is important for the water resistance of the copolyamide.

Y may in particular represent the units 9.T, 12.T, 14.T, or 10.I (I referring to isophthalic acid).

The molar proportion of units Y, relative to the entirety (the sum) of the units 10.T and Y, is from 0% to 30%, preferably from 0% to 20%, and more preferably from 0% to 10%.

The proportion of units X is from 0.4 to 0.8 mol per mole of semi-aromatic units (that is, per mole of the entirety of units 10.T and, where appropriate, Y), preferably from 0.5 to 0.7 per mole of aromatic units.

According to one embodiment, the copolyamide X/10.TN is devoid of units Y.

X may be selected from a unit obtained from an amino acid, a unit obtained from a lactam, and a unit $X_1.X_2$ corresponding to the formula (Ca aliphatic diamine).(Cb (cyclo)aliphatic dicarboxylic acid), where a represents the number of carbon atoms in the diamine and b represents the number of carbon atoms in the dicarboxylic acid, a and b each being between 6 and 18 (endpoints included).

The copolyamide X/10.TN advantageously has a polymolecularity index, abbreviated Ip, of less than or equal to 3.5. The polymolecularity index of said copolyamide is preferably between 2.0 and 3.0 (endpoints included).

This index is measured conventionally and as known to the skilled person by size exclusion chromatography or gel permeation chromatography. The polymolecularity index of the copolyamides of the invention is preferably measured by gel permeation chromatography. More particularly it is measured in a solvent appropriate for the copolyamide, such as a fluorinated solvent, as for example hexafluoroisopropanol, at a temperature of between 20° C. and 50° C., preferably at 40° C.

It is specified that the expression "between", used in the preceding paragraphs, but also in the remainder of the present description, should be understood as including each of the endpoints stated.

With regard more specifically to the meaning of the unit X, when X represents an amino acid, it may be selected in particular from 9-aminononanoic acid (X=9), 10-aminodecanoic acid (X=10), 10-aminoundecanoic acid (X=11), 12-aminododecanoic acid (X=12), and 11-aminoundecanoic acid (X=11) and its derivatives, especially N-heptyl-11-aminoundecanoic acid.

In place of an amino acid, consideration may also be given to a mixture of two, three, etc., or more amino acids such as described here. The copolyamides formed then comprise three, four, etc., or more units, respectively.

When X represents a lactam, it may be selected from caprylolactam, pelargolactam, decanolactam, undecanolactam, and lauryllactam (X=12).

X preferably denotes a unit obtained from a monomer selected from 10-aminoundecanoic acid (coded 11), 11-aminoundecanoic acid (coded 11), 12-aminododecanoic acid (coded 12), and lauryllactam (coded L12).

Among the combinations which can be contemplated, the following copolyamides are of particular interest: copolyamides conforming to one of the formulae selected from 11/10.T and 12/10.T.

When the unit X is a unit conforming to the formula $X_1.X_2$, the unit (Ca diamine) is selected from linear or branched aliphatic diamines.

When the diamine is linear, of formula $H_2N—(CH_2)_a—NH_2$, the monomer (Ca diamine) is preferably selected from hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), and diamines obtained from fatty acids.

When the diamine is branched, it may comprise one or more methyl or ethyl substituents on the main chain. For example, the monomer (Ca diamine) may advantageously be selected from 2,2,4-trimethyl-1,6-hexanediamine, 2,4,4-trimethyl-1,6-hexanediamine, 2-methyl-1,5-pentanediamine, and 2-methyl-1,8-octanediamine.

The expression "monomer (Cb (cyclo)aliphatic dicarboxylic acid)" refers to an aliphatic monomer, which may be linear or branched, or a cycloaliphatic monomer.

When the monomer (Cb dicarboxylic acid) is aliphatic and linear, it is selected from adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), and octadecenedioic acid (b=18).

When the dicarboxylic acid is cycloaliphatic, it may comprise the following carbon frameworks: norbornylmethane, cyclohexylmethane, dicyclohexylmethane, dicyclohexylpropane, di(methylcyclohexyl)propane.

Among all of the possible combinations for copolyamides X/10.T in which X is a (Ca aliphatic diamine).(Cb (cyclo)aliphatic dicarboxylic acid) unit, those employed in particular will be copolyamides conforming to one of the formulae selected from 6.10/10.T, 6.12/10.T, 10.6/10.T, 10.10/10.T, 10.12/10.T, 12.12/10.T, and 10.14/10.T.

With regard to the terpolymers X/10.T/Y (with units Y present), those employed in particular will be copolyamides conforming to one of the formulae selected from 11/10.T/10.I, 12/10.T/10.I, 6.10/10.T/10.I, 6.12/10.T/10.I, 10.6/10.T/10.I, 10.10/10.T/10.I, 10.12/10.T/10.I, 12.12/10.T/10.I, and 10.14/10.T/10.I; 11/10.T/9.T, 12/10.T/9.T, 6.10/10.T/9.T, 6.12/10.T/9.T, 10.6/10.T/9.T, 10.10/10.T/9.T, 10.12/10.T/9.T, 12.12/10.T/9.T, and 10.14/10.T/9.T; 11/10.T/12.T, 12/10.T/12.T, 6.10/10.T/12.T, 6.12/10.T/12.T, 10.6/10.T/12.T, 10.10/10.T/12.T, 10.12/10.T/12.T, 12.12/10.T/12.T, and 10.14/10.T/12.T; 11/10.T/14.T, 12/10.T/14.T, 6.10/10.T/14.T, 6.12/10.T/14.T, 10.6/10.T/14.T, 10.10/10.T/14.T, 10.12/10.T/14.T, 12.12/10.T/14.T, and 10.14/10.T/14.T.

Although the majority of the comonomers or starting products contemplated in the present description (amino acids, diamines, dicarboxylic acids) are saturated, there is nothing to prevent the possibility that they may be partially unsaturated.

Mention may be made, for example, of the fact that the C18 dicarboxylic acid may be octadecanedioic acid, which is saturated, or else octadecenedioic acid, which itself has an unsaturation.

The copolyamide of the invention may comprise monomers originating from resources resulting from renewable raw materials, in other words comprising organic carbon obtained from biomass and determined according to standard ASTM D6866. These monomers resulting from renewable raw materials may be 1,10-decanediamine or, when present, in particular, 11-aminoundecanoic acid, and the aliphatic and linear dicarboxylic acids and diamines as defined above.

The copolyamides of the invention may be prepared by polycondensation of the above-defined comonomers, in the presence, for example, of hypophosphorous acid or at least one of its salts.

The detailed description of a polycondensation process of this kind is contained in particular in document WO 2010/015786.

More particularly, according to a first embodiment, this process comprises the single step of reacting the amino acid X (or the Ca and Cb dicarboxylic acids and diamines) and the stochiometric combination of decanediamine and terephthalic acid (and optionally isophthalic acid), in the presence of sodium hypophosphite, water, and optionally other additives. The time, temperature, and pressure conditions are described in greater detail in document WO 2010/015786.

According to a second embodiment, this process comprises two steps. The first step leads to a diacidic oligomer, which undergoes polycondensation during the second step with the decanediamine, according to the following sequence: first reaction step of the terephthalic acid (and optionally isophthalic acid) with the amino acid X, in the presence of a hypophosphite salt; and second reaction step of the diacidic oligomer thus formed in the preceding step with decanediamine. The time, temperature, and pressure conditions are described in greater detail in document WO 2010/015786. Where X is a (Ca aliphatic diamine).(Cb (cyclo)aliphatic dicarboxylic acid) mixture, it is possible to introduce from 10% to 100% by weight of the Ca diamine in the first reaction step, any remainder of the Ca diamine being introduced with the Cb (cyclo)aliphatic dicarboxylic acid in the second reaction step.

According to a third embodiment, this process comprises two steps: first reaction step of the amino acid X with terephthalic acid (and optionally isophthalic acid), and with 10% to 90% by weight of decanediamine, in the presence of a hypophosphite salt; and second reaction step of the oligomer produced in the first step with the balance of the decanediamine in one or more portions. The time, temperature, and pressure conditions are described in greater detail in document WO 2010/015786. Where X is a (Ca aliphatic diamine).(Cb (cyclo)aliphatic dicarboxylic acid) mixture, it is possible to introduce from 10% to 100% by weight of the Ca diamine in the first reaction step, any remainder of the Ca diamine being introduced with the Cb (cyclo)aliphatic dicarboxylic acid in the second reaction step.

According to a fourth embodiment, this process comprises two steps: first reaction step of the amino acid X with terephthalic acid (and optionally isophthalic acid) and all of the diamine, in the presence of a hypophosphite salt; an oligomer is obtained by discharging of the reactor under steam pressure and crystallization of said oligomer; second step of post polymerization at atmospheric pressure or under vacuum of the oligomer produced in the first step. The time, temperature, and pressure conditions are described in greater detail in document WO 2010/015786.

The polycondensation processes according to the present invention may be performed in any reactor conventionally used in polymerization, such as reactors with anchor or ribbon stirrers. Continuous polymerization processes are likewise possible. However, when the process comprises a second step, as defined above, it may also be performed in a horizontal or finisher reactor, known more commonly by the skilled person as a "finisher". The finishers may be equipped with a device for implementing vacuum or for introducing reactant (addition of diamine), which may be staged or otherwise, and may operate within a wide temperature range.

At the end of this process or during the second step (when the process comprises two steps), as well as the balance of diamine, it is possible to admix the copolyamide X/10.T/Y with customary additives for polyamides, as defined hereinafter. The additives to the copolyamide of the invention are present preferably in an amount of 1% to 70%, more preferably of 5% to 60%, or of 15% to 50%, by weight relative to the weight of the composition.

The copolyamide X/10.T/Y according to the invention preferably has an amine chain end content of greater than or equal to 20 µeq/g, an acid chain end content of less than 100 µeq/g, and a nonreactive chain end content of greater than or equal to 20 µeq/g.

The chain end content of each of the amine, acid, and nonreactive functions is measured conventionally by NMR (Nuclear Magnetic Resonance).

Preferably the amine chain end content is between 25 and 100 µeq/g, and preferably between 30 and 58 µeq/g.

Preferably the acid chain end content is between 2 and 80 µeq/g, and preferably between 15 and 50 µeq/g.

Preferably the nonreactive chain end content is advantageously greater than or equal to 30 µeq/g, and preferably between 35 and 200 µeq/g.

To adjust the chain end content, it is possible to use chain termination agents, these being compounds capable of reacting with the terminal amine and/or carboxylic acid functions of the polyamides, thereby stopping the reactivity of the end of the macromolecule, and hence the polycondensation.

The chain termination agents appropriate for reaction with the terminal amine function may be monocarboxylic acids, anhydrides, such as phthalic anhydride, monohalogenated acids, monoesters, or monoisocyanates. Monocarboxylic acids are used with preference. They may be selected from monocarboxylic aliphatic acids, such as acetic acid, propionic acid, lactic acid, valeric acid, caproic acid, capric acid, uric acid, tridecylic acid, myristic acid, palmitic acid, stearic acid, pivalic acid, and isobutyric acid; alicyclic acids, such as cyclohexanecarboxylic acid; monocarboxylic aromatic acids such as toluic acid, α-naphthalenecarboxylic acid, β-naphthalenecarboxylic acid, methylnaphthalenecarboxylic acid, and phenylacetic acid; and mixtures thereof. Preferred compounds are the aliphatic acids, and especially acetic acid, propionic acid, lactic acid, valeric acid, caproic acid, capric acid, lauric acid, tridecylic acid, myristic acid, palmitic acid, and stearic acid.

The chain termination agents appropriate for reaction with the terminal acid function may include monoamines, monoalcohols, and monoisocyanates. Monoamines are used with preference. They may be selected from aliphatic monoamines, such as methylamine, ethylamine, propylamine, butylamine, hexylamine, octylamine, decylamine, laurylamine, stearylamine, dimethylamine, diethylamine, dipropylamine, and dibutylamine; alicyclic amines, such as cyclohexylamine and dicyclohexylamine; aromatic monoamines, such as aniline, toluidine, diphenylamine, and naphthylamine; and mixtures thereof.

The preferred compounds are butylamine, hexylamine, octylamine, decylamine, laurylamine, stearylamine, cyclohexylamine, and aniline.

It is also possible to react the acid and/or amine ends, respectively, with inorganic bases such as alkali metal and alkaline earth metal hydroxides, such as potassium hydroxide and sodium hydroxide, and with inorganic acids such as HCl, $HNO_3$, and $H_2SO_4$.

The chain termination agents may be introduced during the first and/or second steps, in the case of the two-step production processes of the copolyamide X/10.TN described above. For more details, reference is made here to document WO 2010/015785.

According to one embodiment, the composition of the invention comprises a single copolyamide X/10.TN as described above (and no other polyamide).

According to one variant, the composition of the invention comprises two or a plurality of different copolyamides X/10.T/Y as described above.

According to one variant, the composition of the invention comprises, further to the copolyamide or copolyamides X/10.T/Y as described above, one or more additional polyamides (see below).

Polyolefins

The composition of the invention optionally and advantageously comprises from 5% to 40%, and preferably from 12% to 36%, by weight of at least one polyolefin.

The function of the polyolefins is that in particular of flexibilizing the composition and/or endowing it with impact resistance and/or of enhancing its dimensional stability with respect to water (by virtue of their hydrophobic character).

The polyolefins used may be selected from crosslinked polyolefins, functionalized polyolefins, and mixtures thereof, and optionally other polyolefins. Functionalized polyolefins are advantageously present in the composition.

A crosslinked polyolefin may take the form of a phase dispersed in the matrix formed by the polyamide or polyamides.

This crosslinked polyolefin originates from the reaction of two or at least two products having groups which react with one another.

More particularly, the crosslinked polyolefin is obtained from at least one product (A) comprising an unsaturated epoxide and at least one product (B) comprising an unsaturated carboxylic anhydride.

The product (A) is advantageously a polymer comprising an unsaturated epoxide, this unsaturated epoxide being introduced into said polymer either by grafting or by copolymerization.

The unsaturated epoxide may in particular be selected from the following epoxides:
  aliphatic glycidyl esters and ethers such as allyl glycidyl ether, vinyl glycidyl ether, glycidyl maleate and itaconate, glycidyl acrylate and methacrylate, and
  alicyclic glycidyl esters and ethers such as 2-cyclohexene 1-glycidyl ether, diglycidyl cyclohexene-4,5-carboxylate, glycidyl cyclohexene-4-carboxylate, glycidyl 5-norbornene-2-methyl-2-carboxylate, and diglycidyl endo-cis-bicyclo[2,2,1]-5-heptene-2,3-dicarboxylate.

According to a first form, the product (A) is a polyolefin grafted with an unsaturated epoxide. A polyolefin is understood to be a homopolymer or copolymer comprising one or more olefin units such as units of ethylene, propylene, but-1-ene, or any other alpha-olefin. Examples of polyolefins include the following:
  polyethylene and, in particular, low-density polyethylene (LDPE), high-density polyethylene (HDPE), linear low-density polyethylene (LLDPE), and very low-density polyethylene (VLDPE); polypropylene; ethylene/propylene copolymers; elastomeric polyolefins such as ethylene-propylene (EPR or EPM) or ethylene-propylene-diene monomer (EPDM); or else metallocene polyethylenes obtained by single-site catalysis;

styrene/ethylene-butene/styrene (SEBS) block copolymers; styrene/butadiene/styrene (SBS) block copolymers; styrene/isoprene/styrene (SIS) block copolymers; or else styrene/ethylene-propylene/styrene block copolymers;

copolymers of ethylene and at least one product selected from salts of unsaturated carboxylic acids, esters of unsaturated carboxylic acids, and vinyl esters of saturated carboxylic acids. The polyolefin may in particular be a copolymer of ethylene and alkyl (meth)acrylate, or a copolymer of ethylene and vinyl acetate.

According to a second form, the product (A) is a copolymer of alpha-olefin and an unsaturated epoxide and, advantageously, a copolymer of ethylene and an unsaturated epoxide. The amount of unsaturated epoxide may advantageously represent up to 15% by weight of the copolymer (A), with the amount of ethylene itself representing at least 50% by weight of the copolymer (A).

Mention may be made in particular of copolymers of ethylene, a vinyl ester of saturated carboxylic acid, and an unsaturated epoxide, and of copolymers of ethylene, an alkyl (meth)acrylate, and an unsaturated epoxide. The alkyl of the (meth)acrylate preferably comprises from 2 to 10 carbon atoms. Examples of alkyl acrylates or methacrylates which can be used are, in particular, methyl acrylate, methyl methacrylate, ethyl acrylate, n-butyl acrylate, isobutyl acrylate, and 2-ethylhexyl acrylate.

According to one advantageous version of the invention, the product (A) is a copolymer of ethylene, methyl acrylate, and glycidyl methacrylate, or a copolymer of ethylene, n-butyl acrylate, and glycidyl methacrylate. It will also be possible in particular to use the product sold by Arkema under the name LOTADER® AX8900.

According to another form of the invention, the product (A) is a product having two epoxide functions, such as bisphenol A diglycidyl ether (BADGE).

The product (B) is advantageously a polymer comprising an unsaturated carboxylic anhydride, this unsaturated carboxylic anhydride being introduced into said polymer either by grafting or by copolymerization.

Examples of unsaturated dicarboxylic anhydrides which can be used as constituents of the product (B) are, in particular, maleic anhydride, itaconic anhydride, citraconic anhydride, and tetrahydrophthalic anhydride.

According to a first form, the product (B) is a polyolefin grafted with an unsaturated carboxylic anhydride. As has been seen above, a polyolefin is a homopolymer or copolymer comprising one or more olefin units such as units of ethylene, propylene, but-1-ene, or any other alpha-olefin. This polyolefin may in particular be selected from the examples of polyolefins listed earlier on above for the product (A), when the latter is a polyolefin grafted with an unsaturated epoxide.

According to a second form, the product (B) is a copolymer of alpha-olefin and an unsaturated carboxylic anhydride and, advantageously, is a copolymer of ethylene and an unsaturated carboxylic anhydride.

The amount of unsaturated carboxylic anhydride advantageously may represent up to 15% by weight of the copolymer (B), with the amount of ethylene representing at least 50% by weight of the copolymer (B).

Mention may be made more particularly of copolymers of ethylene, a vinyl ester of saturated carboxylic acid, and an unsaturated carboxylic anhydride, and also of copolymers of ethylene, an alkyl (meth)acrylate, and an unsaturated carboxylic anhydride. The alkyl of the (meth)acrylate preferably comprises from 2 to 10 carbon atoms. The alkyl acrylate or methacrylate may be selected from those given earlier on above for the product (A).

According to an advantageous version of the invention, the product (B) is a copolymer of ethylene, an alkyl (meth)acrylate, and an unsaturated carboxylic anhydride. Preferably the product (B) is a copolymer of ethylene, ethyl acrylate, and maleic anhydride, or a copolymer of ethylene, butyl acrylate, and maleic anhydride. It will be possible in particular to use the products sold by Arkema under the names LOTADER® 4700 and LOTADER® 3410.

It would not be departing the scope of the invention if a part of the maleic anhydride of the product (B), according to the first and second forms which have just been described, was partly hydrolyzed.

According to one particular embodiment of the invention, the amounts by weight of product (A) and of product (B), coded respectively as [A] and [B], may be such that the ratio [B]/[A] is between 3 and 14, and advantageously between 4 and 9.

In the composition according to the invention, the cross-linked polyolefin may also be obtained from products (A) and (B) as described above and from at least one product (C), this product (C) comprising an unsaturated carboxylic acid or an alpha,omega-aminocarboxylic acid.

The product (C) is advantageously a polymer comprising an unsaturated carboxylic acid or an alpha,omega-aminocarboxylic acid, one or other of these acids being introduced into said polymer by copolymerization.

Examples of unsaturated carboxylic acids which can be used as constituents of the product (C) are, in particular, acrylic acid, methacrylic acid, and the carboxylic anhydrides stated above as constituents of the product (B), these anhydrides being completely hydrolyzed.

Examples of alpha,omega-aminocarboxylic acids which can be used as constituents of the product (C) are, in particular, 6-aminohexanoic acid, 11-aminoundecanoic acid, and 12-aminododecanoic acid.

The product (C) may be a copolymer of alpha-olefin and an unsaturated carboxylic acid, and, advantageously, a copolymer of ethylene and an unsaturated carboxylic acid. Mention may be made in particular of the completely hydrolyzed copolymers of the product (B).

According to an advantageous version of the invention, the product (C) is a copolymer of ethylene and (meth)acrylic acid, or a copolymer of ethylene, an alkyl (meth)acrylate, and (meth)acrylic acid. The amount of (meth)acrylic acid may represent up to 10% by weight and, preferably from 0.5% to 5% by weight of the copolymer (C). The amount of alkyl (meth)acrylate is generally between 5% and 40% by weight of the copolymer (C).

The product (C) is preferably a copolymer of ethylene, butyl acrylate, and acrylic acid. It will be possible in particular to use the product sold by BASF under the name LUCALENE® 3110.

According to one particular embodiment of the invention, the amounts by weight of product (A), of product (B), and of product (C), coded respectively [A], [B], and [C], may be such that the ratio [B]/([A]+[C]) is between 1.5 and 8, the amounts by weight of products (A) and (B) being such that $[C] \leq [A]$.

Advantageously, the ratio [B]/([A]+[C]) may be between 2 and 7.

The dispersed, crosslinked polyolefin phase may of course originate from the reaction of one or more products (A) with one or more products (B) and, where appropriate, with one or more products (C).

It is possible to use catalysts which allow the reaction of the reactive functions of the products (A) and (B) to be accelerated. Reference may be made in particular to the teaching of document WO 2011/015790 with regard to examples of catalysts, it being possible for the latter to be used in an amount by weight of between 0.1% and 3% and, advantageously, between 0.5% and 1% of the total weight of the products (A), (B), and, where appropriate (C).

Preferably, when the polyolefin is a crosslinked polyolefin, it is present in the composition in an amount of between 13% and 40% by weight, relative to the total weight of the composition.

The composition of the invention may comprise, furthermore, at least one functionalized polyolefin (D).

According to the invention, functionalized polyolefin (D) means the polymers below.

The functionalized polyolefin (D) may be an alpha-olefin polymer having reactive units: the functionalities. Reactive units of these kinds are carboxylic acid, anhydride, or epoxy functions.

As an example, mention may be made as polyolefins of homopolymers or copolymers of alpha-olefins or diolefins, such as, for example, ethylene, propylene, but-1-ene, oct-1-ene, and butadiene, and more particularly:
  homopolymers and copolymers of ethylene, especially LDPE, HDPE, LLDPE (linear low-density polyethylene), VLDPE (very low density polyethylene), and metallocene polyethylene,
  homopolymers or copolymers of propylene,
  ethylene/alpha-olefin copolymers such as ethylene/propylene copolymers, EPRs (ethylene-propylene rubber), and EPDMs (terpolymer based on ethylene/propylene/diene),
  styrene/ethylene-butene/styrene (SEBS), styrene/butadiene/-styrene (SBS), styrene/isoprene/styrene (SIS), and styrene/-ethylene-propylene/styrene (SEPS) block copolymers,
  copolymers of ethylene with at least one product selected from the salts or esters of unsaturated carboxylic acids, such as alkyl (meth)acrylate (for example, methyl acrylate), or the vinyl esters of saturated carboxylic acids, such as vinyl acetate (EVA), the proportion of comonomer possibly reaching 40% by weight.

These above-described polyolefins may be grafted, copolymerized, or terpolymerized with reactive units (the functionalities), such as carboxylic acid, anhydride, or epoxy functions.

More particularly, these polyolefins are grafted or co- or terpolymerized with unsaturated epoxides such as glycidyl (meth)acrylate, or with carboxylic acids or the corresponding salts or esters, such as (meth)acrylic acid (which may be fully or partially neutralized by metals such as Zn, etc.) or else with carboxylic anhydrides such as maleic anhydride.

The functionalized polyolefin (D) may be selected from the following (co)polymers, grafted with maleic anhydride or glycidyl methacrylate, in which the degree of grafting is, for example, from 0.01% to 5% by weight:
  PE (polyethylene), PP (polypropylene), copolymers of ethylene with propylene, butene, hexene, or octene, containing for example from 35% to 80% of ethylene;
  ethylene/alpha-olefin such as ethylene-propylene copolymers, EPRs, and EPDMs,
  SEBS, SBS, SIS, and SEPS block copolymers,
  EVA copolymers, containing up to 40% by weight of vinyl acetate,
  copolymers of ethylene and alkyl (meth)acrylate, containing up to 40% by weight of alkyl (meth)acrylate,
  copolymers of ethylene and EVA and alkyl (meth)acrylate, containing up to 40% by weight of comonomers.

A functionalized polyolefin is, for example, a PE/EPR blend in which the ratio by weight may vary within broad degrees, as for example between 40/60 and 90/10, said blend being co-grafted with an anhydride, especially maleic anhydride, according to a degree of grafting, for example, of 0.01% to 5% by weight.

The functionalized polyolefin (D) may also be selected from majority-propylene ethylene/propylene copolymers grafted with maleic anhydride and then condensed with mono-amino polyamide (or a polyamide oligomer) (products described in EP-A-0342066).

The functionalized polyolefin (D) may also be a copolymer or a terpolymer of at least one of the following units:
  (1) ethylene,
  (2) alkyl (meth)acrylate or vinyl ester of saturated carboxylic acid, and
  (3) anhydride such as maleic anhydride or (meth)acrylic acid or epoxy such as glycidyl (meth)acrylate.

Examples of functionalized polyolefins of this latter type include the following copolymers, in which ethylene represents at least preferably 60% by weight and in which the termonomer represents for example from 0.1% to 12% by weight of the copolymer:
  ethylene/alkyl (meth)acrylate/(meth)acrylic acid or maleic anhydride or glycidyl methacrylate copolymers;
  ethylene/vinyl acetate/maleic anhydride or glycidyl methacrylate copolymers;
  ethylene/vinyl acetate or alkyl (meth)acrylate/(meth)acrylic acid or maleic anhydride or glycidyl methacrylate copolymers.

In the preceding copolymers, the (meth)acrylic acid may be salified by the salts of Zn or Li.

The term "alkyl meth(acrylate)" (D) denotes $C_1$ to $C_8$ alkyl acrylates and methacrylates; the alkyl meth(acrylate) may be selected from methyl acrylate, ethyl acrylate, n-butyl acrylate, isobutyl acrylate, 2-ethylhexyl acrylate, cyclohexyl acrylate, methyl methacrylate, and ethyl methacrylate.

Moreover, the aforementioned polyolefins (D) may also be crosslinked by any appropriate process or agent (diepoxy, dicarboxylic acid, peroxide, etc.); the "functionalized polyolefin" also includes mixtures of the aforementioned polyolefins with a difunctional reactant such as a dicarboxylic acid, dianhydride, diepoxy, etc., which is capable of reacting with the latter, or mixtures of at least two functionalized polyolefins which are able to react with one another.

The copolymers (D) mentioned above may also be copolymerized randomly or in sequenced form and may have a linear or branched structure.

The molecular weight, the MFI index, and the density of these polyolefins may also vary to a large degree, as the skilled person will appreciate. The MFI index is the melt flow index. It is measured according to standard ASTM 1238.

The functionalized polyolefins (D) are advantageously selected from any polymer comprising alpha-olefinic units and units which bear reactive polar functions such as epoxy, carboxylic acid, or carboxylic anhydride functions. Examples of such polymers include terpolymers of ethylene, alkyl acrylate, and maleic anhydride or glycidyl methacrylate, such as the Lotader® products from the applicant company, or polyolefins grafted with maleic anhydride, such as the Orevac® products from the applicant company, and also terpolymers of ethylene, alkyl acrylate, and (meth)

acrylic acid. Mention may also be made of homopolymers or copolymers of polypropylene which are grafted with a carboxylic anhydride and then condensed with polyamides or mono-amino oligomers of polyamide, as described in patent application EP 0342066.

More particularly the functionalized polyolefins (D) are:
terpolymers of ethylene, alkyl acrylate, and maleic anhydride;
terpolymers of ethylene, alkyl acrylate, and glycidyl methacrylate;
polypropylenes and polyethylenes grafted with maleic anhydride;
copolymers of ethylene and of propylene and optionally of monomeric diene that are grafted with maleic anhydride;
copolymers of ethylene and octene that are grafted with maleic anhydride;
and mixtures thereof.

Preferably, when the polyolefin is a functionalized polyolefin (D), it is present in an amount of between 10% and 40% by weight, preferably between 15% and 30% by weight, relative to the total weight of the composition.

In addition to a crosslinked and/or functionalized polyolefin, the composition of the invention may advantageously comprise at least one nonfunctionalized polyolefin (E).

A nonfunctionalized polyolefin (E) is conventionally a homopolymer or copolymer of alpha-olefins or of diolefins, such as, for example, ethylene, propylene, but-1-ene, oct-1-ene, and butadiene. The following may be mentioned by way of example:
polyethylene homopolymers and copolymers, more particularly LDPE, HDPE, LLDPE (linear low-density polyethylene), VLDPE (very low-density polyethylene), and metallocene polyethylene,
homopolymers or copolymers of propylene,
ethylene/alpha-olefin such as ethylene/propylene copolymers, EPRs, and EPDMs,
SEBS, SBS, SIS, and SEPS block copolymers,
copolymers of ethylene with at least one comonomer selected from salts or esters of unsaturated carboxylic acids, such as alkyl (meth)acrylate (for example, methyl acrylate), or vinyl esters of saturated carboxylic acids such as EVA, the proportion of comonomer possibly reaching 40% by weight, relative to the total weight of the copolymer,
and mixtures thereof.

The abovementioned copolymers (E) may be copolymerized randomly or in sequenced form and may have a linear or branched structure.

The nonfunctionalized polyolefins (E) are advantageously selected from homopolymers or copolymers of polypropylene and any homopolymer or copolymer of ethylene and a comonomer of alpha-olefin type higher than propylene, such as butene, hexene, octene, or 4-methyl-1-pentene. Mention may be made, for example, of polypropylenes, high-density polyethylenes, medium-density polyethylenes, linear low-density polyethylenes, low-density polyethylenes, and very low-density polyethylenes. These polyethylenes are known by the skilled person as being produced according to a radical process, according to Ziegler-type catalysis, or, more recently, according to metallocene catalysis. Preference is also given to copolymers of ethylene and EVA, such as those sold under the trade name EVATANE by the applicant company.

When the composition of the invention comprises a nonfunctionalized polyolefin, the latter is present preferably in an amount of between 5% and 30% by weight, preferably between 10% and 20% by weight, relative to the total weight of the composition.

Other Additives

The composition of the invention advantageously comprises a plasticizer, preferably in a proportion by mass from 1% to 10%, more preferably from 2% to 7%, relative to the total mass of the composition.

Advantageously, a plasticizer is used which has a high thermal stability, so as not to form fumes during steps of mixing of the various polymers and of converting of the resulting composition.

This plasticizer may be selected more particularly from:
benzenesulfonamide derivatives such as n-butylbenzenesulfonamide (BBSA), ortho and para isomers of ethyltoluenesulfonamide (ETSA), N-cyclohexyltoluenesulfonamide, and N-(2-hydroxypropyl)benzenesulfonamide (HP-BSA),
esters of hydroxybenzoic acids such as 2-ethylhexyl para-hydroxybenzoate (EHPB) and 2-hexyldecyl para-hydroxybenzoate (HDPB),
esters or ethers of tetrahydrofurfuryl alcohol such as oligoethyleneoxy-tetrahydrofurfuryl alcohol, and
esters of citric acid or hydroxymalonic acid, such as oligoethyleneoxymalonate.

A preferred plasticizer, being commonly used, is n-butylbenzenesulfonamide (BBSA).

Another particularly preferred plasticizer is N-(2-hydroxypropyl)benzenesulfonamide (HP-BSA). This is because the latter has the advantage of preventing the formation of deposits on the screw and/or on the extrusion die ("die drool") during a step of conversion by extrusion.

A mixture of these plasticizers may also be used.

The composition of the invention advantageously comprises at least one heat stabilizer.

The heat stabilizer may be present in an amount of 0% to 4%, in particular of 0.01% to 2% or of 0.1% to 0.3% by weight, relative to the total weight of the composition.

This may be a copper heat stabilizer.

More particularly it may be a copper salt or a copper salt derivative, as for example copper iodide, copper bromide, copper halides, and derivatives or mixtures thereof. Copper (I) salts are preferred. Examples are copper iodide, copper bromide, copper chloride, copper fluoride, copper thiocyanate, copper nitrate, copper acetate, copper naphthenate, copper caprate, copper laurate, copper stearate, copper acetylacetonate, and copper oxide. Copper iodide, copper bromide, copper chloride, and copper fluoride are preferred.

As a heat stabilizer, consideration may also be given to a metal halide salt in combination with LiI, NaI, KI, MgI$_2$, KBr, or CaI$_2$. KI and KBr are preferred.

The copper heat stabilizer is preferably a mixture of potassium iodide and copper iodide (KI/CuI).

The mixture of potassium iodide and copper iodide that can be used according to the present invention is present preferably in a ratio of 90/10 to 70/30.

An example of a stabilizer of this kind is Polyadd P201 from Ciba.

Greater details concerning the copper-based stabilizer will be found in U.S. Pat. No. 2,705,227.

It is also possible to use complexed coppers such as the Bruggolen H3336, H3337, H3373 products from Brueggemann.

The composition of the invention preferably comprises from 0.10% to 0.25% by weight of copper heat stabilizer.

Other possible heat stabilizers are sterically hindered phenolic antioxidants. These compounds are described in detail in document US 2012/0279605, in paragraphs [0025] and [0026], to which reference is made expressly here.

However, according to an alternative embodiment, the composition of the invention is devoid of such hindered phenolic antioxidants.

Another category of possible stabilizers are the sterically hindered amine-based UV stabilizers (or HALS), which are 2,2,6,6-tetramethylpiperidine derivatives. They may be used, for example, in a range from 0% to 1%, or from 0.01% to 0.5%.

The composition of the invention may be composed solely of the four classes of compounds, namely at least one polyolefin, optionally a plasticizer, at least one heat stabilizer (more particularly a copper stabilizer), and the semi-aromatic copolyamide.

However, the composition may also comprise other compounds in addition to those just mentioned. The composition of the invention may, in particular, further comprise at least one additive and/or at least one additional polymer.

The additional additives may be selected in particular from adjuvants which aid conversion (or "processing aids"), fillers, stabilizers other than that defined above, colorants, mold release agents, flame retardants, surfactants, fluorescent whiteners, and mixtures thereof.

Among the colorants, mention may be made in particular of carbon black. The colorants or pigments may be present for example at a level of 0.1% to 0.2% by weight.

Among the processing aids, mention may be made of stearates, such as calcium or zinc stearates, natural waxes, and polymers comprising tetrafluoroethylene (TFE).

The proportion by weight of processing aids is conventionally between 0.01% and 0.3% by weight, advantageously between 0.02% and 0.1% by weight, relative to the total weight of the composition.

The fillers include silica, graphite, expanded graphite, carbon black, glass beads, kaolin, magnesia, slags, talc, nanofillers (carbon nanotubes), metal oxides (titanium oxide), metals, and fibers (aramids, glass, carbon, or plant fibers), especially long or short such fibers.

Depending on the nature of the fillers, the amount thereof may represent up to 50% by weight, advantageously, up to 30% by weight, of the total weight of the composition, and for example from 5% to 30% or from 20% to 30% by weight. The fillers such as expanded graphite, for example, may enhance the thermal conductivity of the material (in order, for example, to promote heat exchange between a chamber of a tube comprising a layer of composition of the invention and the exterior, or between two chambers of a tube comprising a layer of composition of the invention).

The use of fibers, especially short ones, as for example glass fibers, in an amount of 10% to 60% by weight, preferably of 20% to 40% by weight, may reinforce the layer formed from the composition in question (the presence of fibers may be useful, for example, at one end of the circuit element according to the invention, in the region of a connection to another component). The fibers may have a length, for example, of 0.05 to 1 mm, and in particular of 0.1 to 0.5 mm. Their average diameter may be from 5 to 20 µm, preferably from 6 to 14 µm.

The composition of the invention may further comprise one or more additional polymers, and in particular at least one third polymer, such a polymer being different from the semi-aromatic copolyamide(s) and from the polyolefin(s) mentioned above. Alternatively the composition of the invention may have no such additional polymer.

The additional polymer may in particular be selected from a polyamide other than that defined above, a polyamide-block-ether, a polyetheramide, a polyesteramide, a polyphenylene sulfide (PPS), a polyphenylene oxide (PPO), a fluoropolymer, and mixtures thereof.

The additional polymer is preferably selected from aliphatic polyamides and polyamide-block-ethers. The aliphatic polyamides include, in particular, long-chain polyamides such as PA 11, PA 12, PA 6.10, PA 6.12, PA 6.14, PA 10.10, PA 10.12, and PA 12.12.

The composition may therefore contain up to 20% by weight of at least one additional polymer, relative to the total weight of the composition.

As an example of a composition of the invention, use may be made of composition 1, which has the following formulation by mass:
polyamide PA 11/10.T (0.7 mol of 11-aminocarboxylic acid per mole of 1,10-decanediamine and terephthalic acid): 55.8%;
ethylene/ethyl acrylate/maleic anhydride copolymer (mass ratio 69/30/1): 30%;
ethylene/methyl acrylate/glycidyl methacrylate copolymer (ratio 68/24/8): 6%;
HP-BSA: 7%;
heat stabilizer composed of 80% KI, 10% CuI, and 10% calcium stearate: 0.7%;
4,4'-bis(alpha,alpha-dimethylbenzyl)diphenylamine antioxidant: 0.5%.

As an example of the composition of the invention, use may also be made of composition 2, which has the following formulation by mass:
polyamide PA 11/10.T (0.5 mol of 11-aminocarboxylic acid per mole of 1,10-decanediamine and terephthalic acid): 68.25%;
ethylene/ethyl acrylate/maleic anhydride copolymer (mass ratio 69/30/1): 24%;
ethylene/methyl acrylate/glycidyl methacrylate copolymer (ratio 68/24/8): 4%;
ethylene/butyl acrylate/acrylic acid copolymer (ratio 88/8/4): 2%;
heat stabilizer composed of 80% KI, 10% CuI, and 10% calcium stearate: 0.25%;
4,4'-bis(alpha,alpha-dimethylbenzyl)diphenylamine antioxidant: 0.5%;
various additives: 1% (including carbon black).

As an example of the composition of the invention, use may also be made of composition 3, which has the following formulation by mass:
polyamide PA 11/10.T (0.7 mol of 11-aminocarboxylic acid per mole of 1,10-decanediamine and terephthalic acid): 68.25%;
ethylene/ethyl acrylate/maleic anhydride copolymer (mass ratio 69/30/1): 15%;
ethylene/methyl acrylate/glycidyl methacrylate copolymer (ratio 68/24/8): 7.5%;
ethylene/butyl acrylate/acrylic acid copolymer (ratio 88/8/4): 7.5%;
stabilizer: 0.7%;
various additives: 1.05% (including carbon black).

As an example of the composition of the invention, use may also be made of composition 4, which has the following formulation by mass:
polyamide PA 11/10.T (0.7 mol of 11-aminocarboxylic acid per mole of 1,10-decanediamine and terephthalic acid): 85.9%;
ethylene/ethyl acrylate/maleic anhydride copolymer (mass ratio 69/30/1): 6%;
ethylene/methyl acrylate/glycidyl methacrylate copolymer (ratio 68/24/8): 3%;

ethylene/butyl acrylate/acrylic acid copolymer (ratio 88/8/4): 3%;

heat stabilizer composed of 80% KI, 10% CuI, and 10% calcium stearate: 0.7%;

4,4'-bis(alpha,alpha-dimethylbenzyl)diphenylamine antioxidant: 0.5%;

carbon black: 0.9%.

Vapor Compression Circuit Element

The composition of the invention described above is used as a vapor compression circuit element.

A vapor compression circuit comprises at least one evaporator, a compressor, a condenser, and an expander, and also lines for transporting heat transfer fluid between these elements. The evaporator and the condenser comprise a heat exchanger permitting an exchange of heat between a heat transfer fluid, which circulates within the circuit, and another fluid or body.

The installation may include a turbine for generating electricity (Rankine cycle).

The vapor compression circuit may be integrated in an installation which may possibly also comprise at least one heat exchange fluid circuit used for transmitting heat (with or without a change of state) between the heat transfer fluid circuit and the fluid or body to be heated or cooled.

The installation may also possibly comprise two (or more) vapor compression circuits, containing the same or different heat transfer fluids. For example, the vapor compression circuits may be coupled with one another.

The vapor compression circuit operates according to a conventional vapor compression cycle. The cycle comprises the change in state of the heat transfer fluid from a liquid phase (or liquid/vapor biphase) to a vapor phase at a relatively low pressure, then the compression of the vapor-phase fluid to a relatively high pressure, the change in state (condensation) of the heat transfer fluid from the vapor phase to the liquid phase at a relatively high pressure, and the reduction of the pressure in order to restart the cycle.

In the case of a cooling process, heat given off by the fluid or the body which is being cooled (directly or indirectly, via a heat exchange fluid) is absorbed by the heat transfer fluid, in the evaporation of this fluid, at a temperature which is relatively low in relation to the environment. Cooling processes include air conditioning processes (with mobile installations, as for example in vehicles, or with stationary installations), refrigeration processes (with mobile installations, for example in containers, or with stationary installations), and freezing or cryogenic processes.

In the case of a heating process, heat is given up (directly or indirectly, via a heat exchange fluid) from the heat transfer fluid, in the condensation of the latter, to the fluid or body which is being heated, at a relatively high temperature relative to the environment. The installation which allows the transfer of heat to be implemented is in this case called a "heat pump".

A "vapor compression circuit element", is understood to mean, according to the present invention, any component of a circuit of this kind, comprising a chamber, said component being suitable for containing or transporting the heat transfer fluid.

The vapor compression circuit element that is the subject of the present invention is preferably a pipe or tubing (or else a hose). Alternatively the element in question may be a joining element or connector between tubing or between tubing and compressor, or condenser, or heat exchanger, or else a part of a buffer capacity or a heat exchanger. The term "chamber" denotes the interior of said component of said circuit, in particular the interior of the pipe or of the tubing or the interior of the joining element or connector.

The vapor compression circuit element may also be a heat exchanger as such (in which case it comprises at least two chambers for the circulation of two identical or different fluids, with one necessarily giving up heat to the other).

The heat transfer fluid may be contained or transported in gas, liquid, or bi-phase form in the above circuit element.

The layer of composition according to the invention described above may in particular be a monolayer, or may be an inner layer (intended to come into contact with the heat transfer fluid) or an outer layer (intended to be in contact with the environment) of the circuit element. This layer preferably constitutes an inner layer (or coating).

Multilayer Tube

According to one particular embodiment, the vapor compression circuit element according to the invention is a flexible multilayer tube, intended in particular for a motor vehicle air-conditioning installation. This tube may be intended, for example, for connection at each end to metal tubing.

Preferably, and with reference to FIG. 1, the flexible multilayer tube 10 comprises an inner layer 11 composed of the composition of the invention described above, with the following disposed in succession above said layer: optionally a first intermediate layer 12, composed of a first composition comprising an elastomeric material; optionally a second intermediate layer 13, composed of a reinforcing textile; and an outer layer 14 composed of a second composition comprising an elastomeric material.

A tube of this kind may be a "veneer" tube.

The first intermediate layer and/or the second intermediate layer may be omitted when the outer elastomer layer is sufficiently thick and/or when reinforcing fibers and/or fillers are included therein.

It is also possible to provide an architecture wherein the tube has a further layer of elastomeric material, in contact with the inner layer (toward the chamber in the tube).

A tube of this kind may be a barrier tube.

The compositions comprising an elastomeric material may be identical or different. The elastomeric material may comprise a polymer selected from polyisoprenes, polybutadienes, copolymers of butadiene and acrylonitrile, acrylic rubbers (AEM), epichlorohydrin rubbers, copolymers of styrene and butadiene, butyl rubbers, chlorinated butyl rubbers (CI-IIR), brominated butyl rubbers (Br-IIR), chloroprene rubbers (CR), nitrile rubbers, nitrile-butadiene rubbers (NBR), chlorosulfonated polyethylene rubbers (CSM), ethylene-propylene copolymers, EPDMs (ethylene-propylene-diene monomers), ethylene-propylene-1,4-hexadiene terpolymers, ethylene-propylene-dicyclopentadiene terpolymers, brominated isobutylene-co-para-methylstyrenes (BIMS), and combinations thereof. An elastomeric thermoplastic or a vulcanized thermoplastic may be used.

Ethylene-propylene rubbers and EPDMs are preferred.

The reinforcing textile may be formed by braiding, knitting, winding, or helical knitting of fibers. The fibers may be, for example, glass, cotton, steel, polyester, or aramid fibers, or combinations of these. The reinforcement provides pressure resistance in combination with the layers of elastomeric material.

The inner layer (composition of the invention) preferably has a thickness of 25 to 250 μm, and more preferably of 50 to 150 μm.

The thickness of the other layers is adapted according to the pressures used. It is possible, for example, for the assembly of layers made of elastomeric material to be given a total thickness of 1 to 10 mm. The thickness of the second intermediate layer made of reinforcing textile is generally less than 1 mm.

Manufacture of the Composition of the Invention and of Circuit Elements of the Invention The composition of the invention may be prepared by any method enabling a homogeneous mixture to be obtained, such as melt extrusion, compacting, or roll milling.

More particularly, the composition of the invention may be prepared by melt blending of the semi-aromatic polyamide(s), the plasticizer(s), and the products (A), (B), and optionally (C) producing the crosslinked polyolefin(s).

The optional additives and/or additional polymers may themselves be introduced either at the same time as the semi-aromatic polyamide(s), plasticizer(s), and products (A), (B), and, where appropriate, (C), or in a subsequent step.

Advantageously, the composition may be obtained in the form of pellets by compounding, in particular by means of a twin-screw extruder, a co-kneader, or an internal mixer.

These pellets of the composition of the invention, obtained by the above-described preparation process, may be subsequently converted using tools known to the skilled person (such as an injection press or an extruder), particularly in the form of tubes, films, and/or moldings.

It is also possible to use a twin-screw extruder which without intermediate pelletizing feeds an injection press or an extruder, particularly for the production of tubes, films and/or moldings.

The articles or objects according to the invention may be obtained from the above composition by a known conversion process such as injection molding, extrusion, extrusion-blow molding, coextrusion, or multiple injection.

With regard to the manufacture of multilayer tubes described in the preceding section, it is possible to use the following method.

The inner layer (composition of the invention) may be extruded on a flexible or fixed mandrel.

The first intermediate layer (made of elastomeric material) is then applied.

The second intermediate layer (reinforcing textile) is then applied.

Subsequently the outer layer (made of elastomeric material) is applied. Where appropriate, vulcanization is then carried out in order to cure the elastomeric layers.

There is generally no need to use an adhesive between the layers, since the assembly is provided with cohesion through fusional bonding.

The resulting tubes may be cut before or after curing. If they are cut before curing, the tube sections may be disposed on short mandrels (which are curved, for example) before curing, in order to give these tube sections a particular final shape or configuration.

Heat Transfer Fluid

A "heat transfer compound" or "heat transfer fluid" (or refrigerant or cold-generating fluid) is a compound or fluid, respectively, that is capable of absorbing heat by evaporating at low temperature and low pressure and of providing heat by condensing at high temperature and high pressure, in a vapor compression circuit. Generally speaking, a heat transfer fluid may comprise one, two, three, or more than three heat transfer compounds.

Moreover, the heat transfer fluid may optionally comprise one or more additives which are not heat transfer compounds for the intended application.

The heat transfer compounds may be hydrocarbon, ether, hydrofluoroether, hydrofluorocarbons or fluoroolefin compounds or HFO. Hydrofluorocarbons and fluoroolefins are preferred, and more particularly fluoroolefins. Fluoropropenes, fluoropropanes, and fluoroethanes are preferred.

Examples of preferred heat transfer compounds, used individually or as a mixture, are 1,3,3,3-tetrafluoropropene (R-1234ze), 2,3,3,3-tetrafluoropropene (R-1234yf), 1,2,3,3,3-pentafluoropropene (R-1225ye), 1,1,3,3-tetrafluoropropene (R-1234zc), 3,3,3-trifluoropropene (R-1243zf), 2,3,3-trifluoropropene (R-1243yf), 1,1,1,2-tetrafluoroethane (R-134a), 1,1,2,2-tetrafluoroethane (R-134), pentafluoroethane (R-125), difluoromethane (R-32), 1,1-difluoroethane (R-152a), 1,1,1,2,3,3,3-heptafluoropropane (R-227ea), 1,1,1-trifluoropropane (R-263), 1,1,1,3,3,3-hexafluoropropane (R-236fa), 1,1,1,3,3-pentafluoropropane (R-245fa), 1,1,1,3,3-penta fluorobutane (R-365mfc), and trifluoroiodomethane.

The above compounds may also be used as a mixture with ammonia or with carbon dioxide.

According to one preferred embodiment, the heat transfer fluid is R-134a, or R-1234yf, the latter being particularly preferred.

Mixtures of R-1234yf and ammonia, and of R-1234yf and carbon dioxide, are also preferred, especially for stationary air conditioning.

The additives may in particular be selected from lubricants, nanoparticles, stabilizers, surfactants, tracers, fluorescers, odorants, and solubilizers.

The stabilizer or stabilizers, when present, represent preferably not more than 5% by mass in the heat transfer composition. The stabilizers include in particular nitromethane, ascorbic acid, terephthalic acid, azoles such as tolutriazole or benzotriazole, phenolic compounds such as tocopherol, hydroquinone, tert-butylhydroquinone, 2,6-di-tert-butyl-4-methylphenol, epoxides (optionally fluorinated or perfluorinated alkyl, or alkenyl, or aromatic) such as n-butyl glycidyl ether, hexanediol diglycidyl ether, allyl glycidyl ether, butylphenyl glycidyl ether, phosphites, phosphonates, thiols, and lactones.

Lubricants which can be used include, in particular, oils of mineral origin, silicone oils, paraffins of natural origin, naphthenes, synthetic paraffins, alkylbenzenes, poly-alpha-olefins, polyalkylene glycols (PAG), polyol esters (POE) and/or polyvinyl ethers.

According to the invention it is particularly preferred for the heat transfer fluid circulating in the vapor compression circuit to comprise a PAG lubricant or a POE lubricant.

According to one particularly preferred embodiment of the invention, the heat transfer fluid is R-1234yf admixed with PAG lubricant (and optionally further additives).

Among the PAG lubricants it is possible in particular to use those described in document US 2010/0282999, hereby expressly incorporated by reference. These lubricants conform to the formula $R_1—(OR_3)_n—R_2$, in which $R_1$ and $R_2$ are identical or different and represent a hydrogen atom, a C1-C5 alkyl group, or a C2-C5 acyl group, $R_3$ represents a C2-C4 alkylene group, and the molar proportion of C2 alkylene groups in the units $R_3$ is not more than 30%. The hydroxyl value is preferably not more than 100 mgKOH/g, or than 50, 30, or 10 mgKOH/g. The number-average molecular weight of the PAG is preferably from 500 to 3000, or from 600 to 2000, or from 600 to 1500.

Among the PAG lubricants, it is also possible to use those which are described in document US 2010/0175421, hereby expressly incorporated by reference. These lubricants conform to the formula $R_1—[(OR_2)_m—R_3]_n$, in which $R_1$ represents a hydrogen atom, a hydrocarbon group having 1 to 10 carbon atoms, an acyl group having 2 to 10 carbon atoms, a hydrocarbon group having 2 to 6 bonding sites and 1 to 10 carbon atoms, or a hydrocarbon group containing an oxygen atom and having 1 to 10 carbon atoms, $R_2$ represents an alkylene group having 2 to 4 carbon atoms, $R_3$ represents a hydrogen atom, a hydrocarbon group having 1 to 10 carbon atoms, an acyl group having 2 to 10 carbon atoms, or a hydrocarbon group containing an oxygen atom and having 1 to 10 carbon atoms, n represents an integer ranging from 1 to 6, and m is a number such that the average value m×n is from 6 to 80. Examples of such PAGs are polypropylene glycol dimethyl ether, polyethylene-polypropylene glycol dimethyl ether copolymer, polyethylene-polypropylene glycol methyl butyl ether copolymer, and polypropylene glycol diacetate. The hydroxyl value is preferably 5 mgKOH/g or less, or 3 mgKOH/g or less, or 1 mgKOH/g or less. The number-average molecular weight of the PAG is preferably from 500 to 3000, or from 600 to 2500.

Among PAG lubricants, it is also possible to use those which are described in document WO 2010/075046, hereby expressly incorporated by reference. These lubricants conform to the formula $RX(R_aO)_x(R_bO)_yR_c$, in which R is selected from alkyl groups having from 1 to 10 carbon atoms, aliphatic hydrocarbon groups having from 2 to 6 valences, and substituents comprising a heterocycle in which the heteroatom or heteroatoms is or are oxygen, X is selected from O and S, $R_a$ is a C2 alkylene group, $R_b$ is a C3 alkylene group, $R_c$ is identical to R or represents H, and x and y are 0 or an integer less than or equal to 100, independently. The sum x+y is an integer ranging from 5 to 100. The aliphatic hydrocarbon groups include, in particular, alkanes, alkenes, alkynes, and more particularly methyl, butyl, and propyl groups. The lubricant may be a linear oxypropylene homopolymer. Alkoxy terminations, and especially methoxy terminations, are preferred. These lubricants have a kinematic viscosity of preferably at least 30 cSt, or 20 cSt, or 10 cSt at 40° C., or a viscosity index of at least 150, or 120 or 100. The total acid value is preferably less than 0.03, or 0.02, or 0.01 mgKOH/g.

Nanoparticles which can be used include in particular carbon nanoparticles, metal (copper, aluminum) oxides, $TiO_2$, $Al_2O_3$, $MoS_2$, etc.

Tracers (capable of being detected) include deuterated or non-deuterated hydrofluorocarbons, deuterated hydrocarbons, perfluorocarbons, fluoroethers, brominated compounds, iodinated compounds, alcohols, aldehydes, ketones, nitrous oxide, and combinations thereof. The tracer is different from the heat transfer compound or compounds constituting the heat transfer fluid.

Solubilizers include hydrocarbons, dimethyl ether, polyoxyalkylene ethers, amides, ketones, nitriles, chlorocarbons, esters, lactones, aryl ethers, fluoroethers, and 1,1,1-trifluoroalkanes. The solubilizer is different from the heat transfer compound or compounds constituting the heat transfer fluid.

Fluorescers include naphthalimides, perylenes, coumarins, anthracenes, phenanthracenes, xanthenes, thioxanthenes, naphthoxanthenes, fluoresceins, and derivatives and combinations thereof.

Odorants include alkyl acrylates, allyl acrylates, acrylic acids, acrylic esters, alkyl ethers, alkyl esters, alkynes, aldehydes, thiols, thioethers, disulfides, allyl isothiocyanates, alkanoic acids, amines, norbornenes, norbornene derivatives, cyclohexene, heterocyclic aromatic compounds, ascaridole, o-methoxy(methyl)phenol, and combinations thereof.

With regard to motor vehicle air conditioning, preference is given to using a single heat transfer compound (rather than a mixture) and a single lubricant (rather than a mixture), for reasons of stability within the vapor compression circuit.

EXAMPLES

The examples which follow illustrate the invention without limiting it.

Example 1—General Evaluation of the Properties of the Internal Layers According to the Invention In this example, a comparison is made between various properties of a layer composed of a composition comprising a copolyamide of formula X/10.T (according to the invention, molar ratio from 0.5/1 to 0.7/1) with those of layers composed of known compositions, namely:
  a layer composed of an impact-modified PA 6 composition, corresponding to the product sold by DuPont under the name Zytele ST 811;
  a layer composed of an alloy of PA 6 with crosslinked polyolefins (commercial branded product Orgalloy® LT5050 Naturel from Arkema);
  a layer composed of a PA 6.6/6.T composition;
  a layer composed of a PA 9.T or PA 10.T composition (Genestar® N1001 D).

The results are reported in table 1 below. Each layer is scored on a scale from 1 (lowest performance) to 10 (maximum performance).

TABLE 1

Presentation of various properties

| | PA 6.6/6.T | PA 9.T or PA 10.T | PA.6 | Orgalloy ® | PA 11/10.T (invention) |
|---|---|---|---|---|---|
| Barrier to fluorinated refrigerants | 10 | 10 | 5 | 5 | 10 |
| Dimensional stability in association with water | 3 | 7 | 1 | 3 | 7 |
| Water barrier | 7 | 10 | 5 | 7 | 10 |
| Thermal and chemical stability (in the presence of oil and R-134a refrigerant) | 10 | 10 | 5 | 5 | 10 |
| Thermal and chemical stability (in the presence of oil and R-1234yf refrigerant) | 5 | 5 | 3 | 3 | 5 |
| Long-term thermal stability | 5 | 7 | 1 | 3 | 10 |
| Flexibility of resulting tube | 1 | 5 | 5 | 7 | 7 |
| Adhesion of the layer to an elastomer | 3 | 3 | 7 | 7 | 5 |
| Shapeability | 1 | 3 | 7 | 7 | 5 |
| Total score | 45 | 60 | 39 | 47 | 69 |

With regard to the evaluation of the barrier property with respect to fluorinated refrigerants: a measurement of permeation with respect to fluorinated refrigerants (see example 2) showed that the class of semi-aromatic polyamides and copolyamides was a significantly better barrier than the glass of the PA6 and Orgalloy® products.

With regard to the evaluation of the dimensional stability associated with water and of the water barrier: the absorption of water (hence the dimensional variation) and the water permeation into the polyamide materials are associated with the density of amide functions. Accordingly, the polyamides of class PA 6 are the most hydrophilic, followed by PA 6.6/6.T and Orgalloy®, which benefits, by comparison with PA 6, from the hydrophobic character of the polyolefins incorporated, and, lastly, by PA 9.T, 10.T, and the semi-aromatic copolyamides of the invention.

With regard to the evaluation of the thermal and chemical stability (in the presence of oil and R-134a refrigerant): the data for thermal stability (example 4) show that the aromatic polyamides or copolyamides have a greater thermal stability than the class of the PA 6 and Orgalloy® products.

The permeation data (example 2) show that the aromatic polyamides or copolyamides have a greater barrier performance with respect to R-134a than the class of the PA 6 and Orgalloy® products.

With regard to the evaluation of the thermal and chemical stability (in the presence of oil and R-1234yf refrigerant): the data for thermal stability (example 4) show that the aromatic polyamides or copolyamides have a greater thermal stability than the class of the PA 6 and Orgalloy® products.

The permeation data (example 2) show that the aromatic polyamides or copolyamides have a greater barrier performance with respect to R-1234yf than the class of the PA 6 and Orgalloy® products.

With regard to the evaluation of the long-term thermal stability: the thermal stability data (example 4) show that the aromatic polyamides or copolyamides have a greater thermal stability than the class of PA 6 and Orgalloy® products.

With regard to the evaluation of the flexibility of the resulting tube: the tensile modulus data (example 4) show that the Orgalloy® products and aromatic copolyamides of the invention are more flexible and therefore result in more flexible tubes at the same thickness.

With regard to the evaluation of the adherence of the layer to an elastomer: the adherence to elastomer becomes more difficult as the melting temperature of the internal layer goes up (see example 4).

With regard to the evaluation of the shapeability: the greater the increase in the melting temperature (example 4), the greater the shaping temperature, giving rise to an additional energy cost.

Example 2—Properties of Permeability with Respect to Fluorinated Refrigerants

In this example, the permeability with respect to fluorinated refrigerants (R-1234yf and R-134a) having a layer composed of a composition comprising a copolyamide of formula X/10.T (according to the invention) is compared with that of layers composed of known compositions, namely:
- a layer of impact-modified PA 6, corresponding to the product sold by DuPont under the name Zytel® ST 811, which constitutes a current commercial reference for the internal layer of a veneer tube for the transport of refrigerant in a motor vehicle air conditioning circuit;
- a layer based on PA 6/6.6 copolymer, corresponding to the product sold by Arkema under the name Rilsan® RDG113;
- a layer based on PA 11 known for its high heat resistance, sold by Arkema under the name Rilsan® BESN Noir P126TL;
- a layer (according to the invention) composed of composition 1 described above;
- a layer (according to the invention) composed of composition 2 described above.

The flow measurements were carried out with a permeation cell, by Lyssy GPM500/GC coupling at a temperature of 23° C. and 0% relative humidity. The top face of the cell is swept with the test gas, and the flow diffusing through the film in the lower part is measured by gas chromatography. Helium is used as carrier gas sweeping the lower part.

The results are reproduced in tables 2a and 2b below. The thicknesses are expressed in μm (mean thickness and standard deviation); the flows of refrigerants are expressed in $cm^3.25\ \mu m/m^2/24\ h/atm$. The density of the vapor phase of R-134a is 4.24 $kg/m^3$, and the density of the vapor phase of R-1234yf is 37.6 $kg/m^3$.

TABLE 2a

Results for R-134a

|  | Thickness | Flow |
|---|---|---|
| DuPont Zytel ® ST 811 | 40 ± 8 | 0.02 |
| Rilsan ® RDG113 | 87 ± 6 | 0.04 |
| Rilsan ® BESN Noir P126TL | 69 ± 4 | 12 |
| Composition 1 (invention) | 95 ± 5 | <0.01 |

TABLE 2b

Results for R-1234yf

|  | Thickness | Flow |
|---|---|---|
| DuPont Zytel ® ST 811 | 40 ± 8 | 0.02 |
| Rilsan ® BESN Noir P126TL | 69 ± 4 | 3 |
| Composition 2 (invention) | 76 ± 7 | <0.01 |

Example 3—Probabilities of Water Vapor Permeability

In this example, the permeability to water of a layer composed of a composition comprising a semi-aromatic polyamide of formula X/10.T (according to the invention, composition 2) is compared with that of layers composed of known compositions, namely a composition based on PA 11 (product Besno TL), a composition based on PA 12 (product Aesno TL), an Orgalloy® composition (R60ES), and a composition of stabilized PA 6.

The measurements are carried out according to standard ASTM E96, method E. The flows in table 3 are given in $g.25\ \mu m/24\ h/m^2$.

The results are reported in table 3 below.

TABLE 3

Water permeation results

|  | PA 11 | PA 12 | Invention | Orgalloy ® | PA 6 |
|---|---|---|---|---|---|
| 23° C., 85% relative humidity | 28 | 25 | 28 | 17 | 50 |
| 85° C., 85% relative humidity | 1600 | 1600 | 950 | 1600 | 1800 |

Example 4—Physical and Mechanical Properties

In this example, the typical melting temperature expressed in ° C. (measured according to standard ISO 11357), the typical (dry) tensile modulus expressed in MPa (measured according to standard ISO 527), and the heat or temperature resistance for a half-life of 1000 h (measured in accordance with the properties of elongation at break according to standard ISO 527) are compared for a polyamide PA 6.6/6.T, a polyphthalamide PA 9.T (Genestar® N1001D), a polyamide PA 6 (stabilized), a polyamide from the Orgalloy® range (LT 5050 Naturel), and a copolyamide according to the invention (compositions 1 and 2).

The results are reported in table 4 below.

TABLE 4

Physical and mechanical results

| | PA 6.6/6.T | PPA 9.T | PA 6 | Orgalloy® | Invention |
|---|---|---|---|---|---|
| Melting temperature | 280-330 | 260-310 | 225 | 225 | 250-275 |
| Tensile modulus | 3500 | 2500 | 2500 | 700 | 500-1600 |
| Heat resistance | 145 | 145 | 135 | 140 | 160 |

It is clearly apparent from examples above that the copolyamides of formula X/10.T/Y and in particular of formula X/10.T have very satisfactory properties for them to be used as inner layer in a tube in which an HFO refrigerant flows and especially 1234yf in the presence of PAG oil.

The invention claimed is:

1. A vapor compression circuit element comprising at least one layer consisting of (1) 30% to 99% by mass of at least one copolyamide comprising units of the formula X, 10.T and Y and (2) at least one member selected from the group consisting of functionalized polyolefins, plasticizers, conversion aids, fillers, heat stabilizers, UV stabilizers, nucleating agents, dyes, pigments, mold release agents, flame retardants, surfactants, fluorescent whiteners, additional polymers, and antioxidants, wherein:
X represents alternatively the residues of an aliphatic amino acid comprising from 8 to 18 carbon atoms, or a lactam, or the unit $X_1.X_2$ which represents the residues resulting from the condensation of an aliphatic diamine comprising from 6 to 18 carbon atoms and a (cyclo)aliphatic dicarboxylic acid comprising from 6 to 18 carbon atoms;
10.T represents the residues from the condensation of a decane diamine and terephthalic acid; and
Y represents the residues from the condensation of an aliphatic diamine comprising from 9 to 14 carbon atoms and an aromatic dicarboxylic acid, Y being different from the unit 10.T;
the molar proportion of units 10.T in the copolyamide is greater than 0%;
the molar proportion of the units Y relative to the total of units 10.T and Y is from 0% to 30%; and
the proportion of units X is from 0.4 to 0.8 mol per mole of semi-aromatic units 10.T and Y;
wherein the vapor compression circuit element is suitable for transporting a heat transfer fluid selected from the group consisting of hydrocarbon, hydrofluorocarbon, ether, hydrofluoroether, and fluoroolefin compounds.

2. The vapor compression circuit element as claimed in claim 1, wherein the copolyamide is a copolyamide of formula X/10.T.

3. The vapor compression circuit element as claimed in claim 1, wherein X represents either the residues of an aliphatic amino acid comprising from 10 to 12 carbon atoms or the unit $X_1.X_2$ which represents the residues resulting from the condensation of an aliphatic diamine comprising from 6 to 12 carbon atoms and an aliphatic diacid comprising from 6 to 12 carbon atoms.

4. The vapor compression circuit element as claimed in claim 1, wherein Y represents a unit 10.I, 9.T, 12.T, or 14.T.

5. The vapor compression circuit element as claimed in claim 1, wherein the copolyamide is selected from the group consisting of copolyamides of formulae 11/10.T, 12/10.T, 6.10/10.T, 6.12/10.T, 10.6/10.T, 10.10/10.T, 10.12/10.T, 12.12/10.T, and 10.14/10.T.

6. The vapor compression circuit element as claimed in claim 1, wherein the proportion of units X in the copolyamide is from 0.5 to 0.7 mol per mole of semi-aromatic units 10.T and Y.

7. The vapor compression circuit element as claimed in claim 1, wherein the vapor compression circuit element is in contact with the heat transfer fluid and wherein the heat transfer fluid is a admixed with a lubricant.

8. The vapor compression circuit element as claimed in claim 1, wherein the vapor compression circuit element belongs to a vapor compression circuit integrated in a device selected from the group consisting of mobile and stationary air conditioning devices, refrigeration devices, freezing devices, Rankine-cycle and heat-pump heating devices.

9. The vapor compression circuit element as claimed in claim 1, wherein the vapor compression circuit element is a connection element or a pipe.

10. The vapor compression circuit element as claimed in claim 1, wherein said layer is disposed on an inner surface of the element.

11. A vapor compression circuit element as claimed in claim 1, wherein the vapor compression circuit element is a multilayer tube comprising in succession:
an inner layer consisting of the at least one copolyamide;
optionally, a first intermediate layer, composed of a first composition comprising an elastomeric material;
optionally, a second intermediate layer, composed of a reinforcing textile; and
an outer layer, composed of a second composition comprising an elastomeric material.

12. The vapor compression circuit element as claimed in claim 1, wherein the vapor compression circuit element is an extruded article.

13. The vapor compression circuit element as claimed in claim 1, wherein the copolyamide is PA 11/10.T.

14. The vapor compression circuit element as claimed in claim 1, wherein the layer includes a functionalized polyolefin.

15. The vapor compression circuit element as claimed in claim 14, wherein the layer comprises 10% to 40% by weight of the functionalized polyolefin.

16. The vapor compression circuit element as claimed in claim 14, wherein the functionalized polyolefin is an alpha-olefin polymer comprising a reactive unit.

17. The vapor compression circuit element as claimed in claim 16, wherein the reactive unit is a carboxylic acid function, anhydride function, or an epoxy function.

* * * * *